US012546354B1

(12) United States Patent
Martim et al.

(10) Patent No.: US 12,546,354 B1
(45) Date of Patent: Feb. 10, 2026

(54) SAFETY ANCHORING ACCESSORY

(71) Applicant: Tractian Technologies Inc, Atlanta, GA (US)

(72) Inventors: Vinicius Martim, São Paulo (BR); Marlon Douglas do Nascimento Araujo, São Paulo (BR); Flávio Roberto Bizerra Junior, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/304,380

(22) Filed: Aug. 19, 2025

(51) Int. Cl.
F16B 2/08 (2006.01)
F16B 21/08 (2006.01)

(52) U.S. Cl.
CPC ................................. F16B 21/08 (2013.01)

(58) Field of Classification Search
CPC ........................................................ F16B 21/08
See application file for complete search history.

(56) References Cited

U.S. PATENT DOCUMENTS

| 935,151 | A | * | 9/1909 | Harrell | B68B 1/04 24/129 R |
| 2,679,709 | A | * | 6/1954 | Du Bois | A47K 5/05 248/579 |
| 3,937,436 | A | * | 2/1976 | Stewart | E04B 1/34347 52/155 |
| 4,003,169 | A | * | 1/1977 | Young, II | E02D 5/80 52/155 |
| 4,257,570 | A | * | 3/1981 | Rasmussen | B60P 7/0807 248/503 |
| 6,220,562 | B1 | * | 4/2001 | Konkle | A47B 97/00 248/500 |
| 6,418,685 | B1 | * | 7/2002 | Oliver | E02D 5/801 52/169.9 |
| 6,928,783 | B2 | * | 8/2005 | Oliver | E02D 5/801 52/149 |
| 8,011,206 | B2 | * | 9/2011 | Imai | A44C 25/002 63/23 |
| D928,593 | S | * | 8/2021 | Altamura | D8/356 |
| 11,629,776 | B2 | * | 4/2023 | Corey | F16G 11/108 24/129 R |
| 2007/0220717 | A1 | * | 9/2007 | Brinson | A45F 5/02 24/298 |

(Continued)

Primary Examiner — David M Upchurch
(74) Attorney, Agent, or Firm — Cognition IP, P.C.; Edwards Steakley; Justin White

(57) ABSTRACT

A safety anchoring accessory includes a plate, cable, and cable clamp. The plate has a first opening for placement over a separate mechanical component protrusion and a second opening spaced apart from the first opening and movable relative to the mechanical component. The cable includes a first distal end inserted through the second plate opening and a second distal end to be fastened to a separate structure. The cable length is longer than a distance from the separate structure to the second plate opening when the first plate opening is placed over the protrusion and the mechanical component is mounted to a separate mechanical asset. The cable clamp is coupled to the first distal end of the cable to secure the cable to the plate at the second plate opening. The accessory anchors the mechanical component to the separate structure in the event of mounting failure at the mechanical asset.

20 Claims, 12 Drawing Sheets

(56) References Cited

U.S. PATENT DOCUMENTS

| | | | |
|---|---|---|---|
| 2013/0232731 A1* | 9/2013 | Schradin | B65D 63/10 24/16 R |
| 2024/0392823 A1* | 11/2024 | Gurusamy | F16B 21/165 |

* cited by examiner

SAFETY ANCHORING ACCESSORY

CROSS-REFERENCE TO RELATED APPLICATIONS

This application is related to commonly owned U.S. patent application Ser. No. 19/297,904, filed on Aug. 12, 2025, titled "SELF-ALIGNING THREADED MOUNTING ASSEMBLY" and U.S. patent application Ser. No. 19/281,246, filed on Jul. 25, 2025, titled "ADHESIVE BASED MOUNTING ACCESSORY," which applications are all hereby incorporated by reference in their entireties.

TECHNICAL FIELD

The present disclosure relates generally to mechanical coupling arrangements, and more particularly to improved safety devices for coupled mechanical components.

BACKGROUND

Industrial machinery typically involves the implementation of sensors to monitor aspects and performance of machine operations. These can include, for example, vibration, temperature, current, pressure, moisture, and other types of industrial sensors. Many industrial sensors require installation at specific locations and/or orientations relative to machinery to be effective. For example, some vibration sensors must be field installed at a specific rotational orientation and location relative to an industrial motor or another mechanical asset to which it is mounted and intended to monitor. Industrial environments often include many different sensors and other mechanical components mounted to various mechanical assets within the same area.

One problem that can occur with an industrial mechanical component, such as a vibration sensor, is the occurrence of a mounting failure. This can result not only in monitoring disruptions but can also pose significant safety and operational risks, especially in environments where sensors are installed in elevated or hard-to-reach areas. For example, sensors mounted on overhead crane motors may fall onto operating machinery or even onto workers walking on a factory floor, posing risks to personal safety and property damage. As another example, sensors mounted on fans inside cooling towers may fall inside the tower structure and are unlikely to be recovered. Beyond the safety concerns, the loss or misplacement of sensors experiencing mounting failures can result in additional replacement costs, loss of vibration data, and downtime for reinstallation, which can be especially problematic in facilities with continuous operations.

Traditional ways of mounting industrial items can include mated threaded couplings, magnetically attracted components, and/or strong adhesive attachments, many of which are designed to reduce or minimize mounting failure issues. Unfortunately, intense vibrations, mechanical impacts, adhesive fatigue failures, and/or other factors can eventually lead to mounting failures over time even for solidly mounted mechanical components. This can then result in the detachment and possible falling or loss of sensors or other mechanical components, with such negative consequences often being unexpected and unpredictable.

Although traditional ways of mounting industrial items to minimize mounting failure issues have worked in the past, improvements are always helpful. In particular, what is desired are industrial component mounting techniques and arrangements that minimize safety risks and possible component losses due to industrial component mounting failures.

SUMMARY

It is an advantage of the present disclosure to provide mounting techniques and arrangements that minimize safety risks and possible component losses due to industrial component mounting failures. The disclosed features, apparatuses, systems, and methods relate to safety anchoring accessories that can be used with sensors and other mechanical components mounted within an industrial environment. In particular, the disclosed safety anchoring accessories can provide secondary coupling arrangements between mechanical components and mechanical assets where primary coupling arrangements are used to mount the mechanical component to the mechanical asset. These safety anchoring accessories or secondary coupling arrangements can then prevent or minimize devices from falling, causing accidents, or getting lost when the primary coupling arrangements experience mounting failures.

In various embodiments of the present disclosure, a safety anchoring accessory can include a plate, a cable, and a first cable clamp. The plate can have a first opening with an axis extending therethrough and a second opening spaced apart from the first opening. The first opening can be configured to be placed over a protrusion of a separate mechanical component such that the second opening is movable relative to the separate mechanical component. The cable can have a cable length, a first distal end inserted through the second opening of the plate, and a second distal end configured to be fastened to a separate structure. The cable length can be longer than a distance from the separate structure to the second opening of the plate when the first opening of the plate is placed over the separate mechanical component protrusion and the separate mechanical component is mounted to a separate mechanical asset. The first cable clamp can be coupled to the first distal end of the cable such that the first cable clamp secures the cable to the plate at the second opening of the plate. Placing the first opening of the plate over the separate mechanical component protrusion and fastening the second distal end of the cable to the separate structure can result in anchoring the separate mechanical component to the separate structure.

In various detailed embodiments, the separate mechanical component can be a vibration sensor and the separate mechanical asset can be an industrial motor. The separate structure can be a fixed rigid item that is independently coupled to the separate mechanical asset. The separate mechanical component protrusion can be a threaded post that extends from the separate mechanical component. In some arrangements, the separate mechanical component protrusion can be configured to be inserted into a separate mounting assembly that in turn is configured to facilitate mounting the separate mechanical component to the separate mechanical asset. The plate can be configured to be located between the separate mechanical component and the separate mounting assembly such that the plate is captured onto the separate mechanical component protrusion. Anchoring the separate mechanical component to the separate structure prevents the separate mechanical component from falling in the event of a mounting failure between the separate mechanical component and the separate mechanical asset. The mounting between the separate mechanical component and the separate mechanical asset can be an adhesive based mounting.

In some arrangements, the safety anchoring accessory can also include a second cable clamp configured to be coupled to the second distal end of the cable such that the second cable clamp secures the cable to the separate structure. The cable length distance can result in the cable being slack when the first distal end of the cable is coupled to the separate mechanical component, the separate mechanical component is mounted to the separate mechanical asset, and the second distal end of the cable is coupled to the separate structure. The plate can be configured to spin about the axis through the first opening such that the second opening can be repositioned to any lateral direction relative to the separate mechanical component protrusion when the first opening is placed over the separate mechanical component protrusion. The plate can be flat, thin, and formed from metal, and the cable can be formed from stainless steel.

In further embodiments of the present disclosure, various methods of installing a safety anchoring accessory to a mechanical component mounted to a mechanical asset are provided. Pertinent process steps can include placing a plate onto the mechanical component, moving the plate to a desired relative position, coupling a mounting assembly to the mechanical component, and mounting the mechanical component to the mechanical asset. Placing the plate can involve placing a first opening of the plate over a protrusion of the mechanical component. The plate can include the first opening and a second opening spaced apart from the first opening. The plate can be part of a safety anchoring accessory including the plate, a cable, and a first cable clamp, where the cable includes a first distal end inserted through the second opening of the plate and the first cable clamp is coupled to the first distal end of the cable such that the first cable clamp secures the cable to the plate at the second opening of the plate. The plate can be moved while the first opening remains over the mechanical component protrusion, and moving the plate can result in the second opening moving to a desired position relative to the mechanical component. The mounting assembly can be coupled to the mechanical component protrusion and can result in capturing the plate onto the mechanical component protrusion. The mechanical component can be mounted to the mechanical asset while the plate is captured onto the mechanical component protrusion.

In various detailed embodiments, the mechanical component can be a vibration sensor and the mechanical asset can be an industrial motor. An additional process step can involve coupling a second distal end of the cable to a separate structure. Coupling the cable to the separate structure and capturing the plate onto the mechanical component protrusion while the cable is secured to the plate can result in anchoring the mechanical component to the separate structure. Coupling the cable to the separate structure can involve coupling a second cable clamp to the second distal end of the cable such that the second cable clamp secures the cable to the separate structure. In some arrangements, the length of the cable can be longer than a distance from the separate structure to the second opening of the plate when the first opening of the plate is placed over the separate mechanical component protrusion, the mechanical component is mounted to the mechanical asset, and a second distal end of the cable is coupled to a separate structure. Moving the plate can involve spinning the plate about an axis through the first opening such that the second opening of the plate rotates around the axis at a fixed distance. The plate can be a flat thin plate configured to spin freely 360 degrees around the axis.

In further detailed embodiments, an additional process step can involve removing the mounting assembly from the mechanical component protrusion before placing the first opening of the plate over the mechanical component protrusion. Other process steps can include forming the cable at a specific cable length, wherein the specific cable length is longer than a distance from a separate structure to the second opening of the plate when the first opening of the plate is placed over the mechanical component protrusion and the mechanical component is mounted to the mechanical asset, passing the first distal end of the cable through the second opening of the plate, and crimping the first distal end of the cable onto itself using the first cable clamp such that the first cable clamp secures the cable to the plate at the second opening of the plate.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, and methods of use for safety anchoring accessories that can be used with respect to sensors and other mechanical components mounted within an industrial environment. These drawings in no way limit any changes in form and detail that may be made to the disclosure by one skilled in the art without departing from the spirit and scope of the disclosure.

DETAILED DESCRIPTION

Figure 1A:
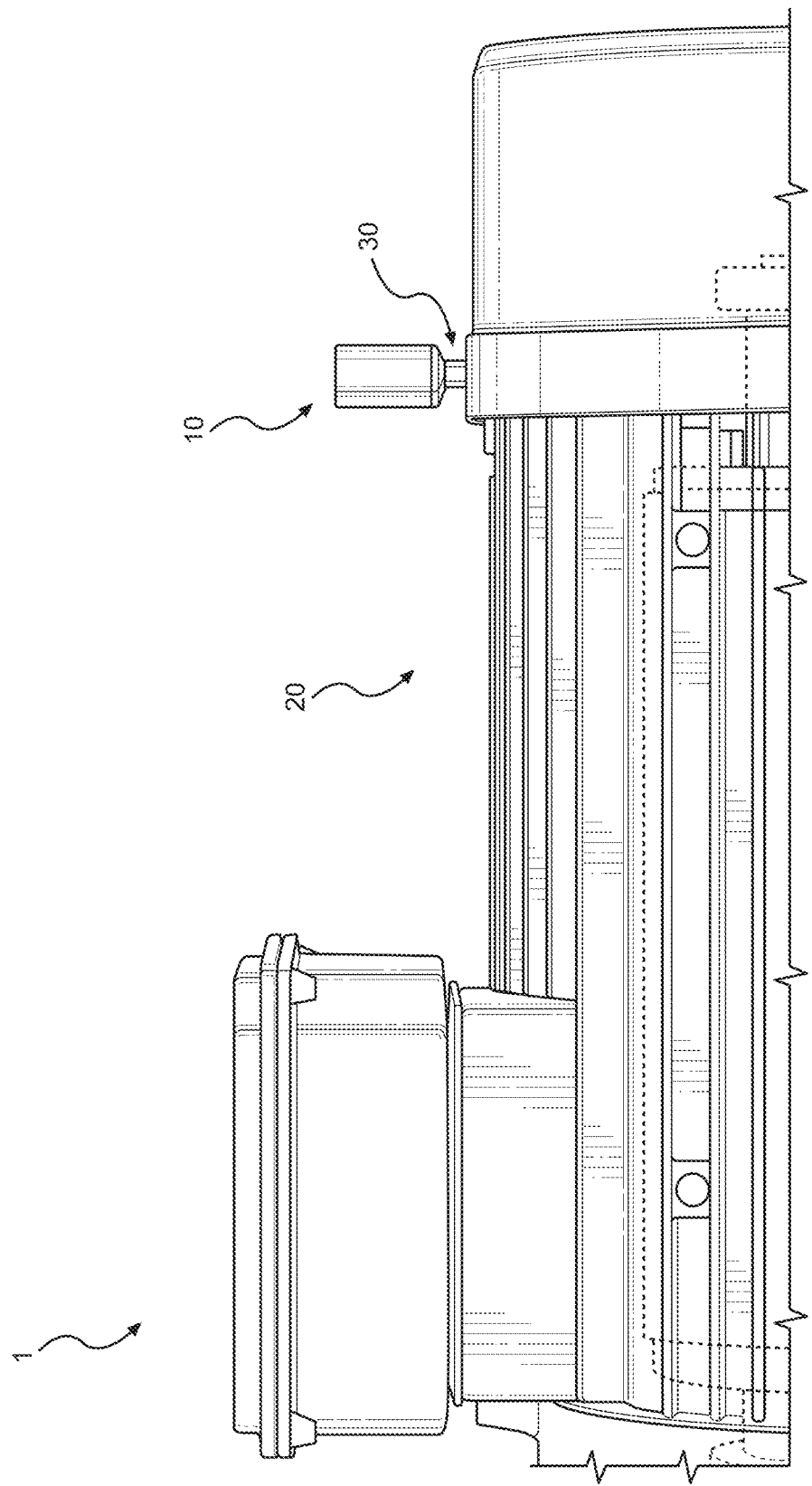
FIG. 1A illustrates in side elevation view an example environment with a mechanical component coupled to a mechanical asset.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving safety anchoring accessories. For example, the disclosed safety anchoring accessories can be used where mechanical components are mounted to mechanical assets within an industrial environment. As will be readily appreciated by those of skill in the art, mounting failures within an industrial environment can result in falling items, which can result in safety hazards, component losses, and/or data losses. The disclosed safety anchoring accessories can minimize such safety risks and possible component losses due to mounting failures for sensors and other mechanical components mounted within an industrial environment.

In particular, the safety anchoring accessories and methods disclosed herein can provide secondary coupling (i.e., safety) arrangements between mechanical components and mechanical assets where primary coupling arrangements are used to mount the mechanical component to the mechanical asset. These safety anchoring accessories or secondary coupling arrangements can then prevent or minimize devices from falling, causing accidents, or getting lost when the primary coupling arrangements experience mounting failures. In specific detailed arrangements, the disclosed safety anchoring accessories can use cables or "safety harnesses" that can be installed at a variety of locations and positions, as well as in a slack configuration while the primary coupling arrangement is maintained, thus providing flexibility and ease of installation as well as unobtrusiveness to normally mounted operating components and any of their various data readings and other features.

Although various embodiments disclosed herein discuss providing a safety anchoring accessory for specific applications involving mounting a vibration sensor to an industrial motor, it will be readily appreciated that the disclosed features, apparatuses, systems, and methods can also be used in other applications and environments where generically mounting a separate mechanical component to a separate mechanical asset is desired. While the use of mounting assemblies and adhesive based mountings are also discussed in the specific applications illustrated, it will also be understood that mounting assemblies may not always be necessary and that other types of mountings can be used for the disclosed safety anchoring accessories. Furthermore, while some examples are provided for specific tools, components, and materials, it will be understood that these can be replaced with any suitable substitute or alternative tools, components, and/or materials that take advantage of the disclosed features. Other applications, arrangements, and extrapolations beyond the illustrated embodiments are also contemplated.

Referring first to FIG. 1A, an example environment with a mechanical component coupled to a mechanical asset is illustrated in side elevation view. Industrial environment 1 can include a relatively smaller mechanical component 10 that is mounted to a relatively larger mechanical asset 20. This can be done using an adhesive, such as a glue or epoxy, and/or can be accomplished using one or more magnets and magnetic forces to effect a suitable mounting. A mounting assembly 30 can be used for this purpose, such as where a bottom surface of mounting assembly 30 is adhered to and/or magnetically coupled an outer surface of mechanical asset 20 while mechanical component 10 is coupled to the mounting assembly 30. In some arrangements, mounting assembly 30 can be considered as part of mechanical component 10, such as where these items can be installed or removed together from a given mechanical asset. In some cases, mounting assembly 30 can also be called a "component base" or a "mounting base," and it will be understood that these terms can be used interchangeably. Mechanical component 10 can be removably coupled to mounting assembly 30, such as by way of a threaded arrangement. In such arrangements, mounting assembly 30 can be permanently adhered to mechanical asset 20 while mechanical component 10 can be removably interchanged at the component base or mounting assembly 30 for another identical or similar mechanical component.

In various arrangements, mechanical component 10 can be a sensor, such as a vibration sensor, for example. Other types of sensors are also possible, such as, temperature, current, pressure, and moisture sensors, with other types of mechanical components suitable for mounting also being possible. Mechanical asset 20 can be a manufacturing or industrial item, such as an industrial motor or engine, for example, although other types of mechanical assets are also possible. Mounting assembly 30 can be a magnetic mounting base, such as that which can be used to ordinarily mount mechanical component 10 to mechanical asset 20 using an adhesive on a bottom surface of mounting assembly 30, as will be appreciated by those of skill in the art. In some arrangements, mounting assembly 30 may not be needed, such that mechanical component 10 can be mounted directly to mechanical asset 20. In some arrangements, mechanical component 10 can be mounted to mechanical asset 20 by inserting a portion of the mechanical component and/or mounting assembly 30 into a threaded opening or other opening in the mechanical asset. Other coupling and mounting arrangements are also possible.

Figure 1B:
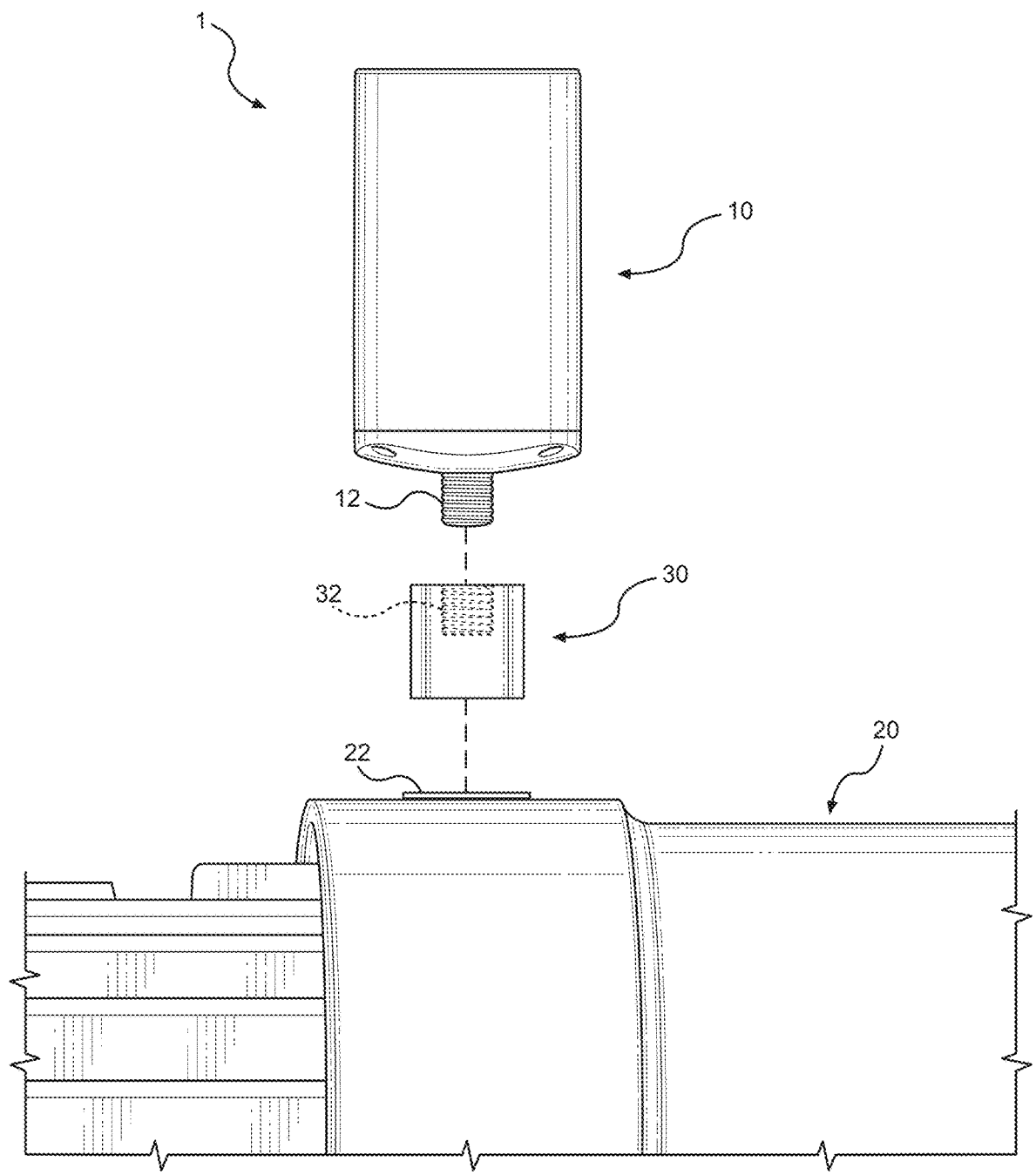
FIG. 1B illustrates in side exploded view the example environment of FIG. 1A with the mechanical component, associated mounting assembly, and mechanical asset all uncoupled from each other.

FIG. 1B illustrates in side exploded view the example environment of FIG. 1A with the mechanical component, mounting assembly, and mechanical asset all uncoupled from each other. In some arrangements, mechanical component 10 and mechanical asset 20 can be separate items that are already available with a desire to mount, attach, or otherwise couple the mechanical component to the mechanical asset, while can involve the use of a suitable mounting assembly 30. Again, industrial environment 1 can include a mechanical component 10 that can be mounted to a mechanical asset 20 using an adhesive and/or magnetic arrangement. Mechanical component 10 can be relatively smaller compared with mechanical asset 20 such that coupling these items together can involve moving and mounting a vibration sensor or other smaller portable mechanical component along with mounting assembly 30 onto an industrial motor or other larger stationary mechanical asset. As noted above, mounting assembly 30 can be considered as a part of mechanical component 10 and can be removable therefrom in some arrangements.

In various embodiments, mounting assembly 30 can be attached or coupled in one or more ways to both mechanical component 10 and mechanical asset 20, and this can involve one or more features on each of these items. Mechanical component 10 can have a threaded post or portion 12 extending outward from a bottom region thereof, which can be standard or readily available features on the mechanical component. For example, many vibration sensors can have a built-in threaded post designed for mounting or coupling the sensor. Mounting assembly 30 can have a threaded inner opening 32 configured to receive threaded portion 12 of mechanical component 10 to facilitate directly coupling these two items, such as by rotational insertion of threaded portion 12 into threaded inner opening 32. This can be a removable coupling such that mechanical component 10 can be removed from its mounting assembly 30.

Mounting assembly 30, which can be a standard magnetic mounting assembly or base for a vibration sensor, for example, can also have one or more outer surfaces along its bottom region configured to facilitate attachment of the mounting assembly to outer surface region 22 of mechanical asset 20. This can include one or more flat surfaces at the bottom of mounting assembly 30, such as flat surfaces at the bottom of a magnet and a mounting assembly housing, for example. Such surface(s) can be configured for attachment to a flat surface region 22 of mechanical asset 20 by way of a suitable adhesive substance, as is generally known by those of skill in the art. Again, while mounting using an adhesive and/or magnetic arrangement using a mounting assembly has been shown for purposes of illustration, it will be readily appreciated that mechanical component 10 can alternatively be mounted to mechanical asset 20 using a threaded post and threaded opening arrangement and/or any other suitable mounting arrangement. Again, such mountings can use a mounting assembly 30 or can involve direct mountings.

Figure 2A:
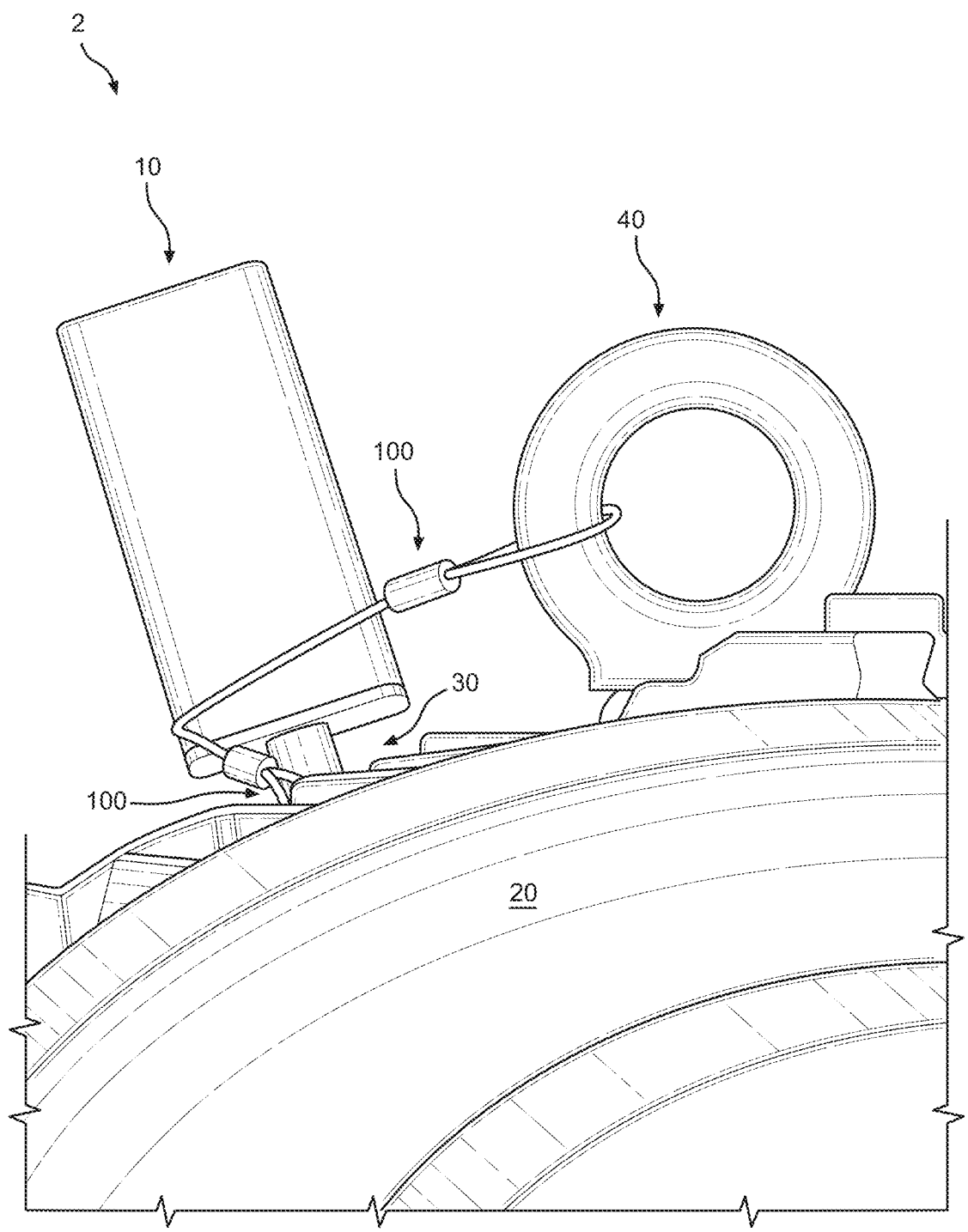
FIG. 2A illustrates in side perspective view an example alternative environment with a mechanical component mounted to a mechanical asset while a safety anchoring accessory prevents the mechanical component from falling in the event of a mounting failure according to one embodiment of the present disclosure.

Continuing with FIGS. 2A-2D, various environments and embodiments using a safety anchoring accessory will now be provided. FIG. 2A illustrates in side perspective view an example alternative environment with a mechanical component mounted to a mechanical asset while a safety anchoring accessory prevents the mechanical component from falling in the event of a mounting failure. Industrial environment 2 can be similar to industrial environment 1 above, albeit with the additional presence of safety anchoring accessory 100 and separate structure 40. Again, industrial environment 2 can include a vibration sensor or other mechanical component 10 that is mounted to an industrial motor or other mechanical asset 20, such as by way of a typical primary coupling or mounting arrangement. Similar to the above arrangement, a mounting assembly 30 can be used for this purpose, such as where a bottom surface of the mounting assembly is adhered to an outer surface of mechanical asset 20 while mechanical component 10 is coupled to the mounting assembly. Safety anchoring accessory 100 can be used to provide a secondary or "safety" coupling for mechanical component 10 and can anchor or otherwise couple the sensor or other mechanical component to separate structure 40 to prevent it from falling in the event that the primary mounting arrangement ever fails.

Separate structure 40 can be any suitable rigid structure that will support safety anchoring accessory 100 and mechanical component 10 to prevent the mechanical component from falling. For example, separate structure 40 can be a rigid metal loop that is separately and independently mounted or affixed to mechanical asset 20, as shown. Separate structure 40 can alternatively be any other rigid item or feature and can part of the mechanical asset 20 itself, such as the mechanical asset frame, or can be a separate item located on the mechanical asset, or can be any other suitably rigid separate item at any other suitable location, such as along a wall, ceiling, or other structural support or item near the mechanical component 10.

Figure 2B:
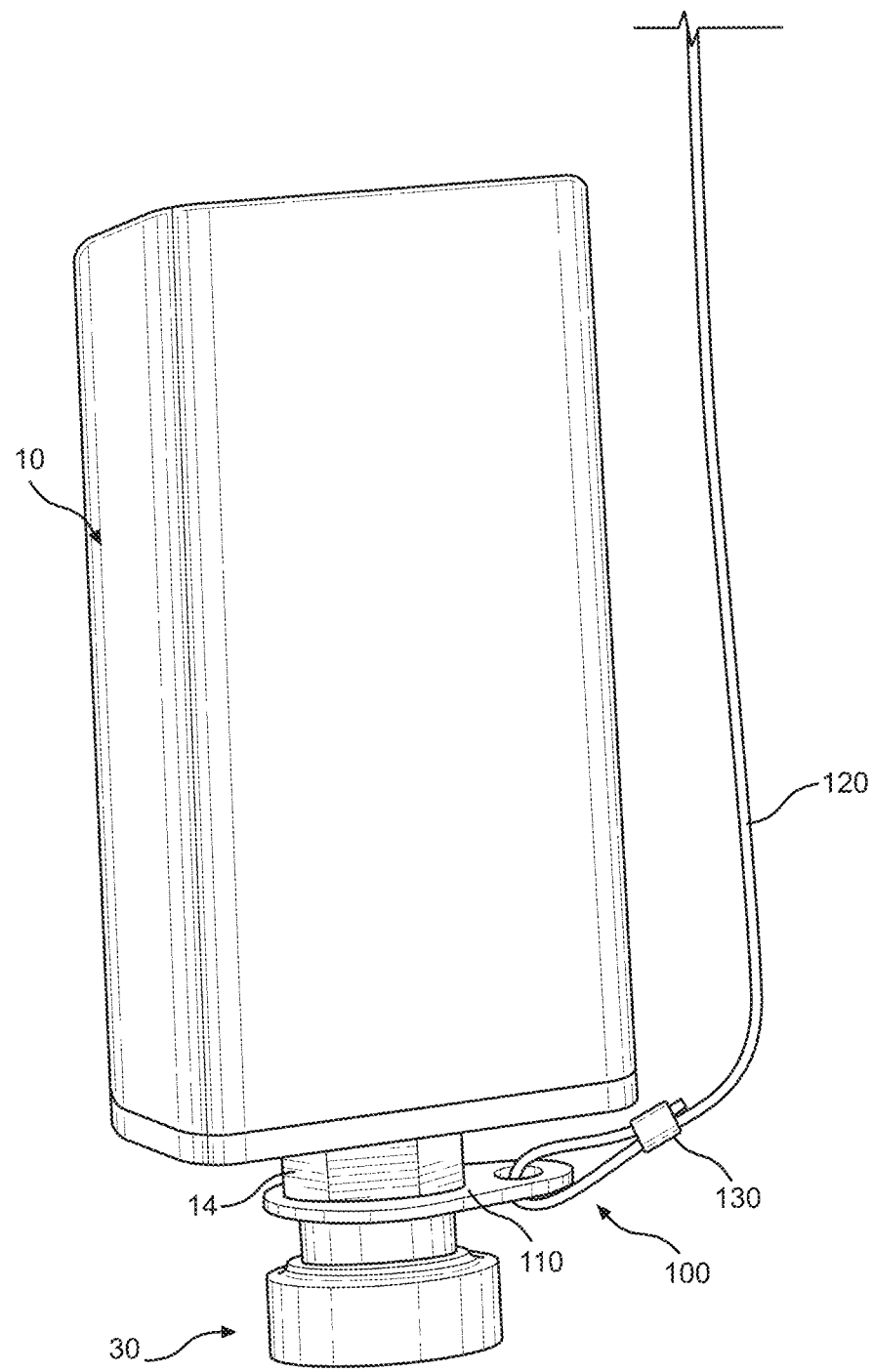
FIG. 2B illustrates in side perspective view an example safety anchoring accessory coupled to a mechanical component with a mounting assembly according to one embodiment of the present disclosure.
Figure 2C:
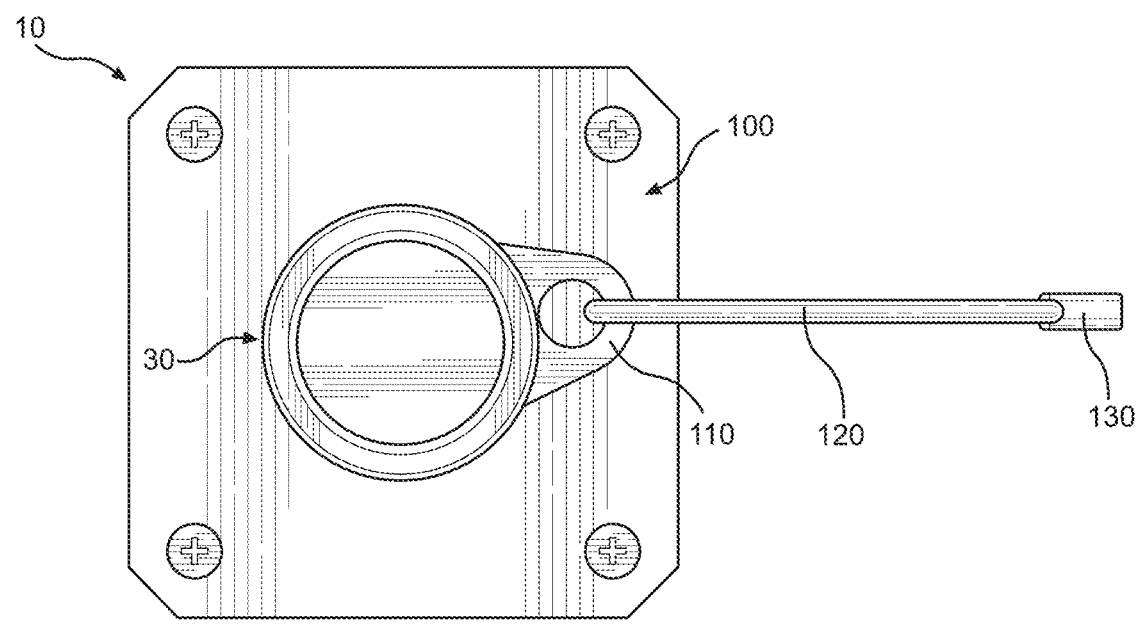
FIG. 2C illustrates in bottom plan view the safety anchoring accessory and mechanical component with mounting assembly arrangement of FIG. 2B according to one embodiment of the present disclosure.

FIGS. 2B and 2C illustrate an example safety anchoring accessory coupled to a mechanical component with a mounting assembly in side perspective and bottom plan views respectively. Again, safety anchoring accessory 100 can be used to anchor or otherwise couple a vibration sensor or other mechanical component 10 to a separate structure (not shown). Safety anchoring accessory 100 can include a plate 110, a cable 120, and a cable clamp 130, among other possible items and features, as set forth in greater detail below. Plate 110 can be located between mounting assembly 30 and a locking nut 14 of mechanical component 10, with all three of these items being mounted or placed on a mechanical component protrusion (not shown), such as threaded post 12 shown in FIG. 1B above. Mounting assembly 30 can be a magnetic mounting assembly configured to be adhered to a separate mechanical asset (not shown). Plate 110 can couple safety anchoring accessory 100 to the vibration sensor or other mechanical component 10 and its mounting assembly 30 in this manner, while one end of cable 120 can be coupled to plate 110 and held in place by way of cable clamp 130. The other end of cable 120 (not shown) can be coupled to the separate structure (not shown) and can be held in place by way of another identical or similar cable clamp (not shown).

As shown in FIGS. 2A-2C, it will be appreciated that safety anchoring accessory 100 can specifically function as a passive safety system that serves as a mechanical redundancy for vibration sensors installed using structural adhesive. Of course, use with other mechanical components and other types of mountings are also possible. Safety anchoring accessory 100 can be installed independently from some or all functional components of its subject sensor or other mechanical component and can be arranged not to interfere with the operation, measurement accuracy, or data transmission of the sensor or other mechanical component. In the event of an adhesive failure, impact, excessive vibration, or other mounting failure, cable 120 can retain the sensor physically and prevent it from falling, disappearing, or being damaged, thus essentially acting as a "safety harness" for the sensor or other harnessed mechanical component.

Figure 2D:
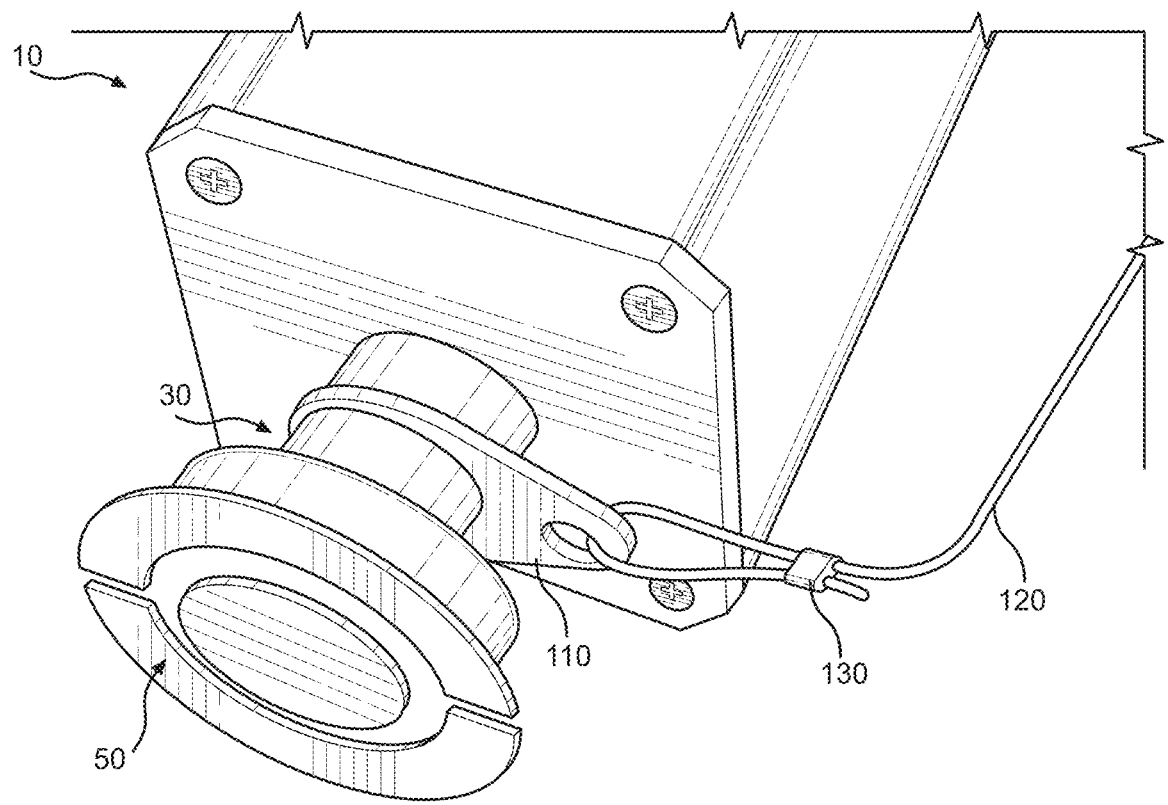
FIG. 2D illustrates in bottom perspective view an example safety anchoring accessory coupled to a mechanical component with an alternative mounting assembly according to one embodiment of the present disclosure.

FIG. 2D shows in bottom perspective view an example safety anchoring accessory coupled to a mechanical component with an alternative mounting assembly arrangement. Various illustrated items and features can be identical or substantially similar to those which are shown in FIGS. 2B and 2C above. In addition, mounting assembly 30 can also have an adhesive based mounting accessory 50 coupled thereto. Various details for mounting assembly 30 and adhesive based mounting accessory 50 can be found in commonly owned U.S. patent application Ser. No. 19/281, 246, filed on Jul. 25, 2025, titled "ADHESIVE BASED MOUNTING ACCESSORY," which is again incorporated herein by reference in its entirety. This alternative mounting assembly arrangement reflects just one of many possible alternative mounting arrangements, and it will be understood that safety anchoring accessory 100 and its components and features can also be used with a variety of different possible mounting arrangements.

Figure 3:
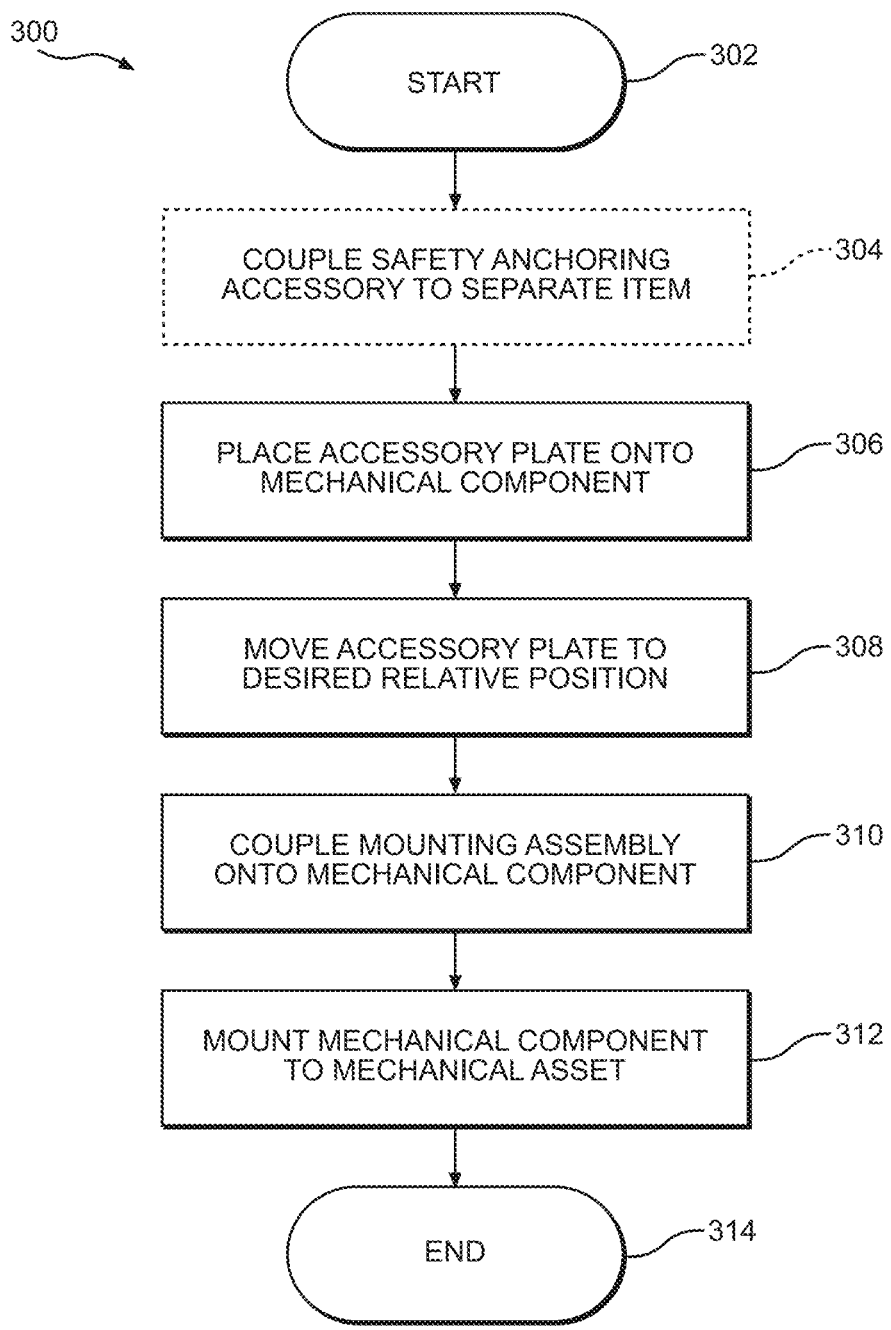
FIG. 3 illustrates a flowchart of an example summary method of installing a safety anchoring accessory to a mechanical component mounted to a mechanical asset according to one embodiment of the present disclosure.

Moving next to FIG. 3, a flowchart is provided of an example summary method of installing a safety anchoring accessory to a mechanical component mounted to a mechanical asset. Summary method 300 can represent one broad aspect of various overall methods of installing a safety anchoring accessory, and it will be understood that various other steps and details of such a broad aspect and overall methods are not provided here for purposes of simplicity. While summary method 300 and other disclosed methods can involve using a safety anchoring accessory while mounting a vibration sensor to an industrial motor, for example, it is also contemplated that the various disclosed methods can alternatively be applied to other types of mechanical components, other types of mechanical assets, and other mounting types.

After a start step 302, an optional process step 304 can involve coupling a safety anchoring accessory to a separate structure or item. This step may not be necessary in all situations, such as where the safety anchoring accessory is already coupled to the separate structure so that applying the safety anchoring accessory to the mechanical component to mechanical asset mounting is all that is necessary to complete installation. In the event that it is needed, step 304 can involve passing one end of the safety anchoring accessory cable through the separate structure and crimping that cable end in place with a cable clamp, for example.

At process step 306, a plate of the safety anchoring accessory can be placed onto the vibration sensor or other mechanical component. This can involve placing a first opening of the accessory plate over a protrusion of the mechanical component. The protrusion can be a threaded post, for example, that extends from a bottom of the mechanical component. The plate itself can have the first opening and a second opening spaced apart from the first opening, with the plate being part of an overall safety anchoring accessory including the plate, a cable, and a first cable clamp. The cable can include a first distal end inserted through the second opening of the plate, and the first cable clamp can be coupled to the first distal end of the cable such that the first cable clamp secures the cable to the plate at the second opening of the plate.

The next process step 308 can involve moving the accessory plate to a desired position relative to the vibration sensor or other mechanical component. Moving the plate can be dome while the first opening remains over the mechanical component protrusion, such as by spinning or rotating the plate. Moving the plate can result in the second opening moving to a desired position relative to the sensor or mechanical component. This can also result in moving the first distal end of the cable to the desired position, which can thus result in the cable being positioned at a desired location alongside the sensor or other mechanical component.

At following process step 310, a mounting assembly can be coupled to the protrusion of the mechanical component or device. This can involve, for example, a standard coupling of a typical mounting assembly to a typical threaded post of a vibration sensor, which can be done while the first opening of the plate is placed over the threaded post. Coupling the mounting assembly in this manner can result in capturing the plate onto the mechanical component protrusion, since the plate can then not be readily removed from the protrusion.

Subsequent process step 312 can then involve mounting the mechanical component to the mechanical asset. This can be done while the mechanical component is coupled to the mounting assembly, while the plate is captured onto the mechanical component protrusion, and while the plate is moved to the desired position. This last step can complete the process of installing the safety anchoring accessory to a mechanical component mounted to a mechanical asset, such as a vibration sensor mounted to an industrial motor. In various arrangements, the cable of the safety anchoring accessory can have a sufficient amount of slack after installation, such that the cable and the rest of the accessory do not interfere with the mechanical component. This process can result in forming a coupling redundancy for the mechanical component, with the safety anchoring accessory coupling the mechanical component to the separate structure in the event that the primary mounting of the component to the asset fails.

Summary method 300 can then end at end step 314. In some arrangements, one or more of the foregoing steps can be performed simultaneously or in a different order. For example, optional process step 304 can be performed at any time during the process, such as after every other step has been performed. As another example, steps 306 and 308 can be performed simultaneously in some arrangements. Not all steps are necessary in all situations, and additional steps and details can be added. Further steps, details, and variations are provided in detailed method 600 set forth below.

Figure 4A:
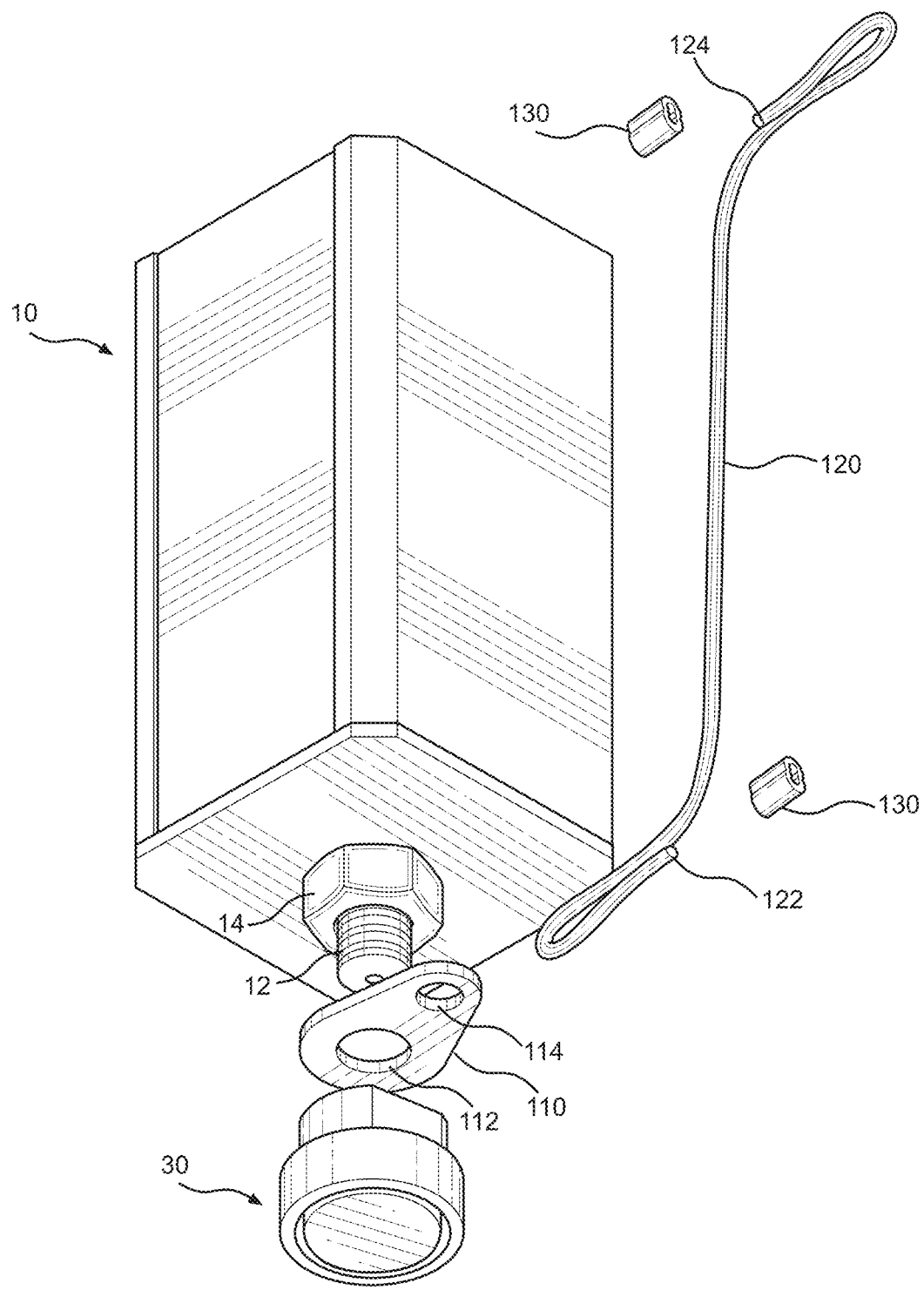
FIG. 4A illustrates in exploded bottom perspective view an example safety anchoring accessory and associated mechanical component with a mounting assembly according to one embodiment of the present disclosure.
Figure 4B:
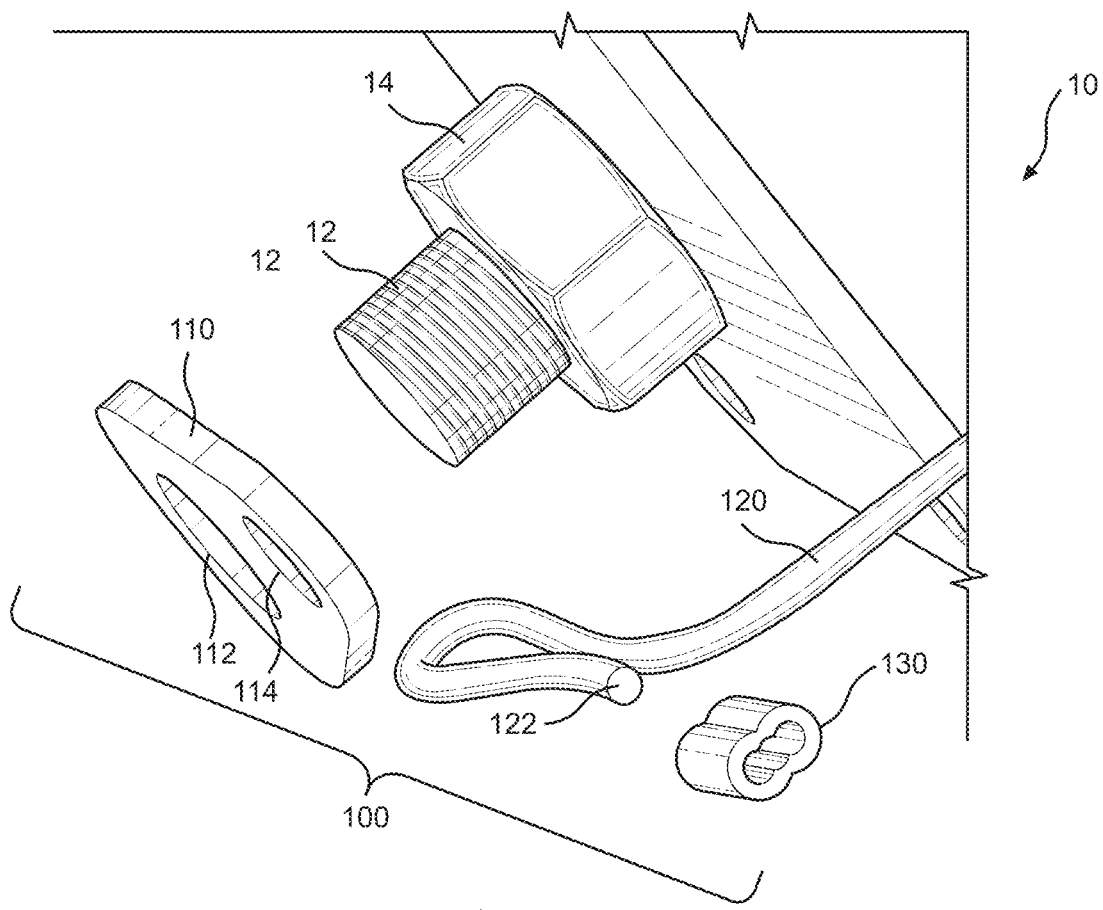
FIG. 4B illustrates in exploded side perspective view various portions of an example safety anchoring accessory and associated mechanical component protrusion according to one embodiment of the present disclosure.

Turning next to FIGS. 4A and 4B, an example safety anchoring accessory and an associated separate mechanical component with a mounting assembly are more robustly illustrated in exploded bottom perspective view and exploded side perspective view respectively. Mechanical component 10 and mounting assembly 30 can be identical or substantially similar to that which is shown in FIG. 1B above, with threaded post 12 of mechanical component 10 being configured for insertion into a threaded inner opening (not shown in FIG. 4A) of mounting assembly 30. Again, the disclosed safety anchoring accessory can include at least a plate 110, a cable 120, and one or more cable clamps 130, among other possible items and features. One or more components of the safety anchoring accessory can be installed prior to the insertion of mechanical component protrusion 12 (e.g., a threaded post) into a threaded inner opening of mounting assembly 30.

For example, plate 110 can include a first opening 112 that can be placed over protrusion 12 before mechanical component 10 is coupled to mounting assembly 30 (e.g., a threaded post is inserted into a threaded inner opening). First opening 112 can be placed over protrusion 12 such that a second opening 114 of plate 110 is movable relative to the vibration sensor or other separate mechanical component 10. For example, plate 110 can be a flat, thin, plate configured to spin or rotate about an axis through first opening 112 while placed over protrusion 12 such that the second opening 114 can freely rotate around this axis to any lateral position relative to mechanical component 10.

As another example, cable 120 can include a first distal end 122 that can be passed through second opening 114 of plate 110. Cable 120 can loop back upon itself after passing through second opening 114 and cable clamp 130 can then be crimped onto the cable to secure the cable onto plate 110 by way of the looped portion. Although coupling cable 120 to plate 110 and crimping cable clamp 130 onto the cable in this manner can be done at any time to form a secure coupling of the cable 120 to plate 110, it can be helpful for these components of the safety anchoring accessory to be coupled before inserting protrusion 12 into mounting assembly 30.

As another example of safety anchoring accessory components that can optionally be installed prior to insertion of mechanical component protrusion 12 into mounting accessory 30, cable 120 can also include a second distal end 124 that can be secured to a separate structure such as the rigid loop shown in FIG. 2A. Second distal end 124 of cable 120 can similarly be passed through or around a rigid loop or other separate structure and a second cable clamp 130 can be used to crimp the cable onto itself to secure the cable to the separate structure. It will be appreciated that securing cable 120 to the separate structure in this manner can be done before or after inserting protrusion 12 into mounting assembly 30.

Placing first opening 112 of plate 110 over protrusion 12 can result in the plate being located between a locking nut 14 on the protrusion and a top surface of mounting assembly 30, such that the plate is captured onto the protrusion and cannot escape after protrusion 12 has been inserted into mounting assembly 30. Other capturing items along protrusion 12 besides a locking nut 14 and mounting assembly 30 are also possible, as will be readily appreciated. In some arrangements, plate 110 can be configured such that it is loosely captured and can still be moved freely (e.g., spun) about protrusion 12 after full installation of the safety anchoring accessory. This can allow for the repositioning of second opening 114 and thus cable 120 to another location about mechanical component 10 even after installation. In other arrangements, vibration sensor or other mechanical component 10 can be sufficiently tightened to mounting assembly 30 such that plate 110 is sufficiently clamped or pressed between locking nut 14 and the mounting assembly so that it is unable to freely move or spin about protrusion 12 after assembly.

Figure 4C:
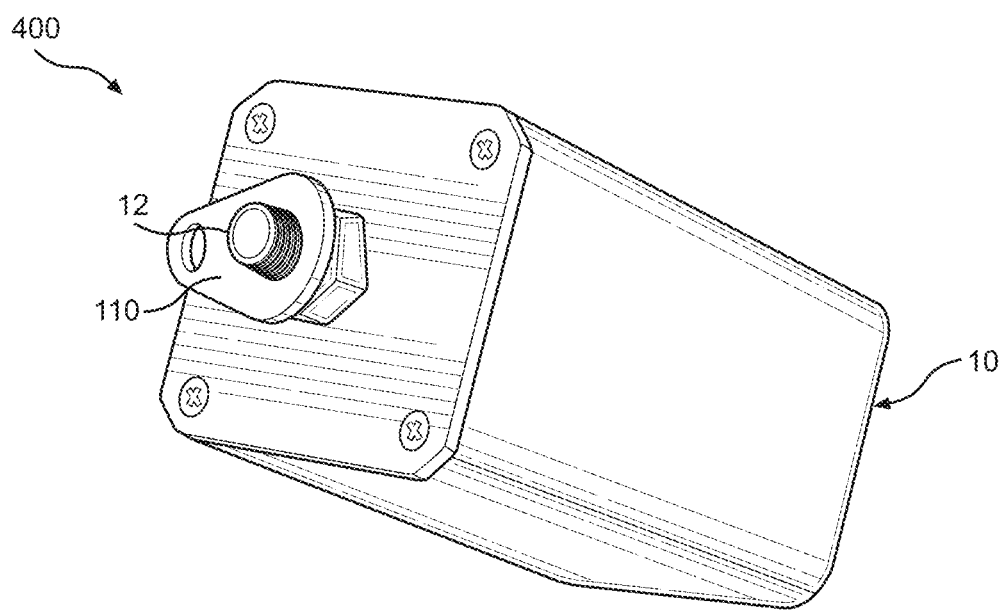
FIG. 4C illustrates in bottom perspective view a safety anchoring accessory plate placed onto an associated mechanical component protrusion according to one embodiment of the present disclosure.

FIG. 4C illustrates in bottom perspective view a safety anchoring accessory plate placed onto an associated mechanical component protrusion. Configuration 400 reflects a stage in the overall installation process of a safety anchoring accessory where plate 110 has been placed onto protrusion 12 of mechanical component 10 before the mechanical component has been coupled to a mounting assembly and/or a separate mechanical asset. As shown, a cable is coupled to plate 110, which has been placed over threaded post or other protrusion 12 of a vibration sensor or other mechanical component 10. Protrusion 12 is then ready for coupling to a mounting assembly and/or mechanical asset, at which point plate 110 will then be captured onto the protrusion such that it is coupled to the protrusion and cannot be readily removed.

Figure 5A:
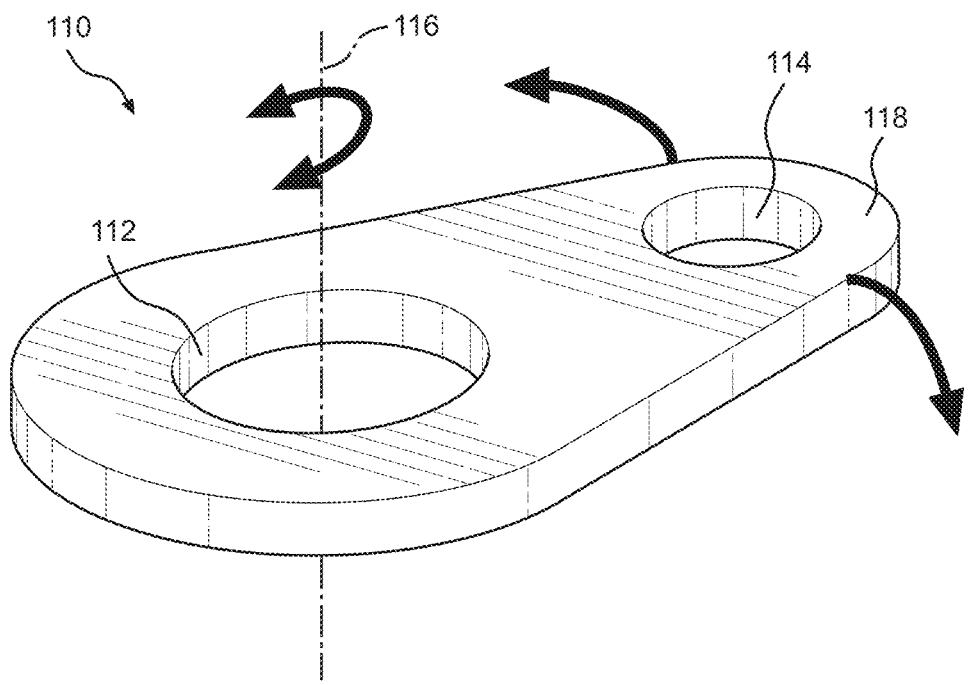
FIG. 5A illustrates in side perspective view an example safety anchoring accessory plate according to one embodiment of the present disclosure.

Continuing with FIGS. 5A-5D, various components and features of the disclosed safety anchoring accessories will now be illustrated and described in greater detail. FIG. 5A shows an example safety anchoring accessory plate in side perspective view. As noted above, plate 110 can be the safety anchoring accessory component that is placed over a protrusion of a mechanical component, such as a threaded post of a vibration sensor, for example. Plate 110 can serve as a primary anchoring point for the disclosed safety anchoring accessory, such as when its first opening 112 is captured onto a mechanical component protrusion (e.g., threaded post) such that the plate is affixed or otherwise coupled to the mechanical component.

Plate 110 can have first opening 112, a second opening 114, an axis 116 extending through the first opening about which the plate is configured to move, and a moving end 118, among other possible features. First opening 112 can be the larger opening, can be configured to fit over a vibration sensor threaded post or other mechanical component protrusion, and can be located toward the center of plate 110. Second opening 112 can be the smaller opening, can be configured to accommodate a cable of the safety anchoring accessory passing therethrough, and can be located toward moving end 118 of plate 110. When first opening 112 is placed over a mechanical component post or protrusion, the entire plate 110 can be configured to move about axis 116 such that second opening 114 and moving end 118 move around this axis. For example, plate 110 can spin about axis 116 in either direction along a plane running through the plate such that second opening 114 and moving end 118 rotate about the axis at a fixed distance therefrom. In various embodiments, plate 110 can be a thin, flat, metal plate having an oblong geometry with circular openings 112, 114 as shown, although other materials, shapes, and plate and opening geometries are also possible.

In some arrangements, plate 110 can be configured to be pressed and held between two different items during installation such that the plate is not free to move relative to the vibration sensor or other mechanical component after installation is complete. For example, plate 110 can be pressed between a locking nut at a top flat side of the plate and an upper surface of a mounting assembly at a bottom flat side of the plate such that the plate cannot spin or move when the locking nut is tightened firmly to the mounting assembly. In other arrangements, plate 110 can be loosely captured between the locking nut and mounting assembly such that the plate remains free to spin, rotate, or otherwise move after installation. Such a loose capture can allow for adjustment of the safety accessory cable to a different position relative to the mechanical component by rotating the plate such that second opening 114 moves to a different position.

Figure 5B:
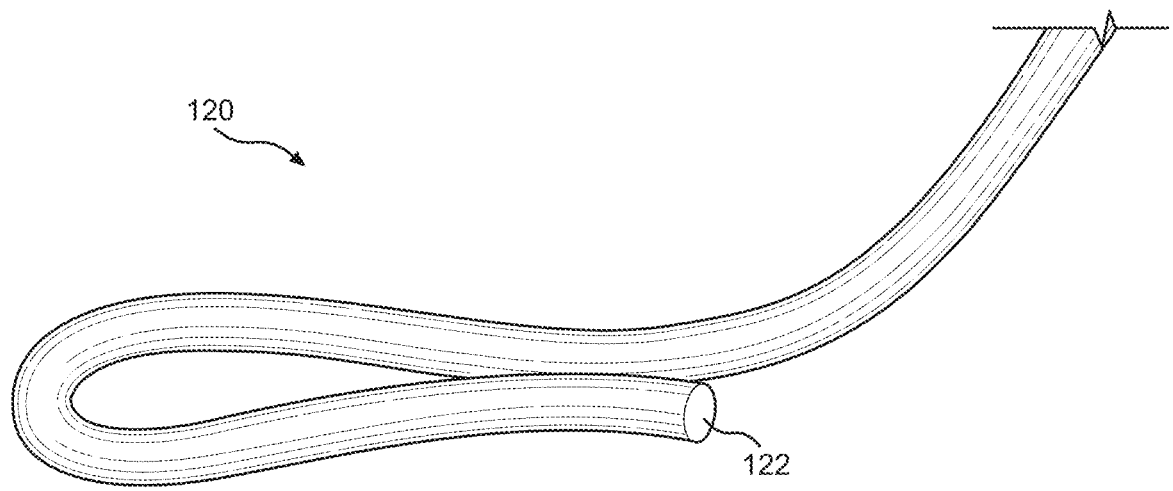
FIG. 5B illustrates in side perspective view an example safety anchoring accessory cable according to one embodiment of the present disclosure.

FIG. 5B depicts an example safety anchoring accessory cable in side perspective view. Cable 120 can be of a specific installed length and can include a first distal end 122 and an identical or similar second distal end (not shown). First distal end 122 can be configured for insertion through second opening 114 of plate 110 above, while the second distal end can be configured to be fastened to a separate structure. As noted above, the length of cable 120 can be longer than a distance from the separate structure to the second opening 114 of plate 110 when the first opening 112 of the plate is placed over the separate mechanical component protrusion and the separate mechanical component is mounted to a separate mechanical asset.

In some specific embodiments, cable 120 can be formed from a 1/16 inch diameter stainless steel cable, for example, which can be corrosion resistant, flexible, and strong enough to hold and prevent the vibration sensor or other mechanical component from falling in the event that the primary mounting fails between the mechanical component and the mechanical asset. In some arrangements, cable 120 can be provided at an original length of about one meter or more but can be cut or otherwise shortened as desired for a particular installation. This "installation length" can result in there being a sufficient amount of slack in cable 120 when the full safety anchoring accessory is installed such a loose tether coupling is formed and there is no tension along the installed cable 120. Other materials, measurements, original lengths, installation lengths, and properties for cable 120 are also possible where suitable.

Figure 5C:
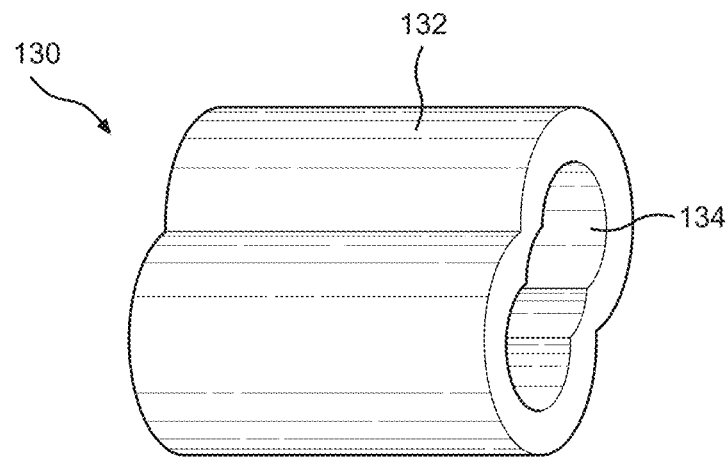
FIG. 5C illustrates in side perspective view an example safety anchoring accessory cable clamp according to one embodiment of the present disclosure.

FIG. 5C illustrates an example safety anchoring accessory cable clamp in side perspective view. Cable clamp 130 can be used to secure a distal end of the accessory cable in place against another item, such as the accessory plate or a separate structure to which the safety anchoring accessory and mechanical component are tethered or coupled. This can be done by crimping cable clamp 130 while the accessory cable is positioned therein. Cable clamp 130 can be a relatively thin material forming a continuous or substantially continuous outer wall 132 around its circumference with at least one longitudinal opening 134 extending therethrough from one end to the other. Opening 134 can be sized and shaped to accept the cable therethrough at multiple locations along the opening. Cable clamp 130 can comprise a strong but deformable material such that its outer wall 132 can be crimped at one or more locations after the cable has been passed therethrough multiple times to firmly fasten the cable clamp onto the cable within opening 134 and thereby prevent any further movement of the cable through the opening. In some arrangements, cable clamp 130 can be a single integrally formed item or can comprise multiple parts fused together to form its final shape.

Figure 5D:
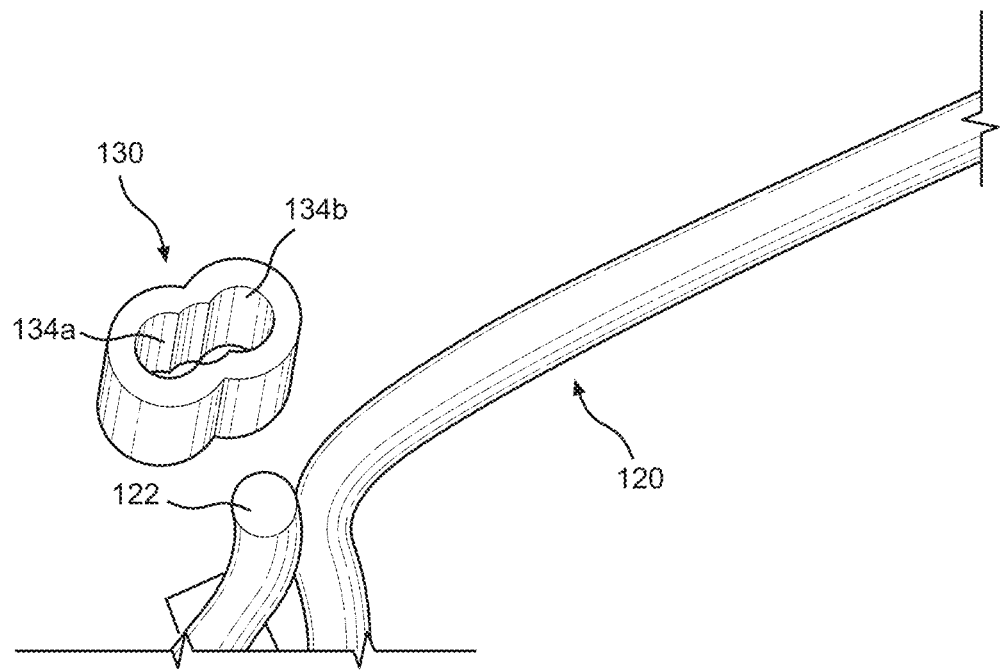
FIG. 5D illustrates in bottom perspective view an example safety anchoring accessory cable and cable clamp prior to crimping according to one embodiment of the present disclosure.

FIG. 5D shows in bottom perspective view an example safety anchoring accessory cable and cable clamp prior to crimping illustrates in bottom perspective view. As shown, cable clamp 130 can include a longitudinal opening therethrough that includes opening portion 134a and opening portion 134b. Each opening portion 134a, 134b can be sized, shaped, and otherwise configured to accept one portion of cable 120 therethrough before crimping. This can allow for a loop or other portion of cable 120 to be formed before crimping cable clamp 130 onto multiple portions of the cable to fasten the cable clamp against the cable and thus secure any component or feature located within the formed cable loop or portion.

For example, first distal end 122 of cable 120 can be passed through cable clamp 130 at opening portion 134b for a sufficient length and then can be passed back through the cable clamp at opening portion 134a such that a closed loop is formed in the cable at a side of the cable clamp opposite the final location of the first distal end. Before passing first distal end 122 back through opening portion 134b, this distal end can be passed through the second opening of the safety anchoring plate such that the plate is captured within the closed loop formed in cable 120. Cable clamp 130 can then be crimped onto cable 120 along opening portion 134a (and optionally opening portion 134b) such that the cable can no longer move through the crimped opening portion(s) and is thus secured to the safety anchoring plate at the second opening of the plate.

In various embodiments, two cable clamps 130 can be used for a safety anchoring accessory. A first cable clamp 130 can be used to secure a first distal end 122 of cable 120 to a safety anchoring plate as illustrated and described above. A second cable clamp, which can be identical or substantially similar to first cable clamp 130, can similarly be used to secure a second distal end of cable 120 to a separate structure, which can be a separate item affixed to the mechanical asset, the frame or another feature of the mechanical asset itself, for example, or any other fixed structure suitable for anchoring. As noted above, fastening or otherwise securing the second distal end of the cable to the separate structure can result in anchoring the separate mechanical component to the separate structure.

Figure 6:
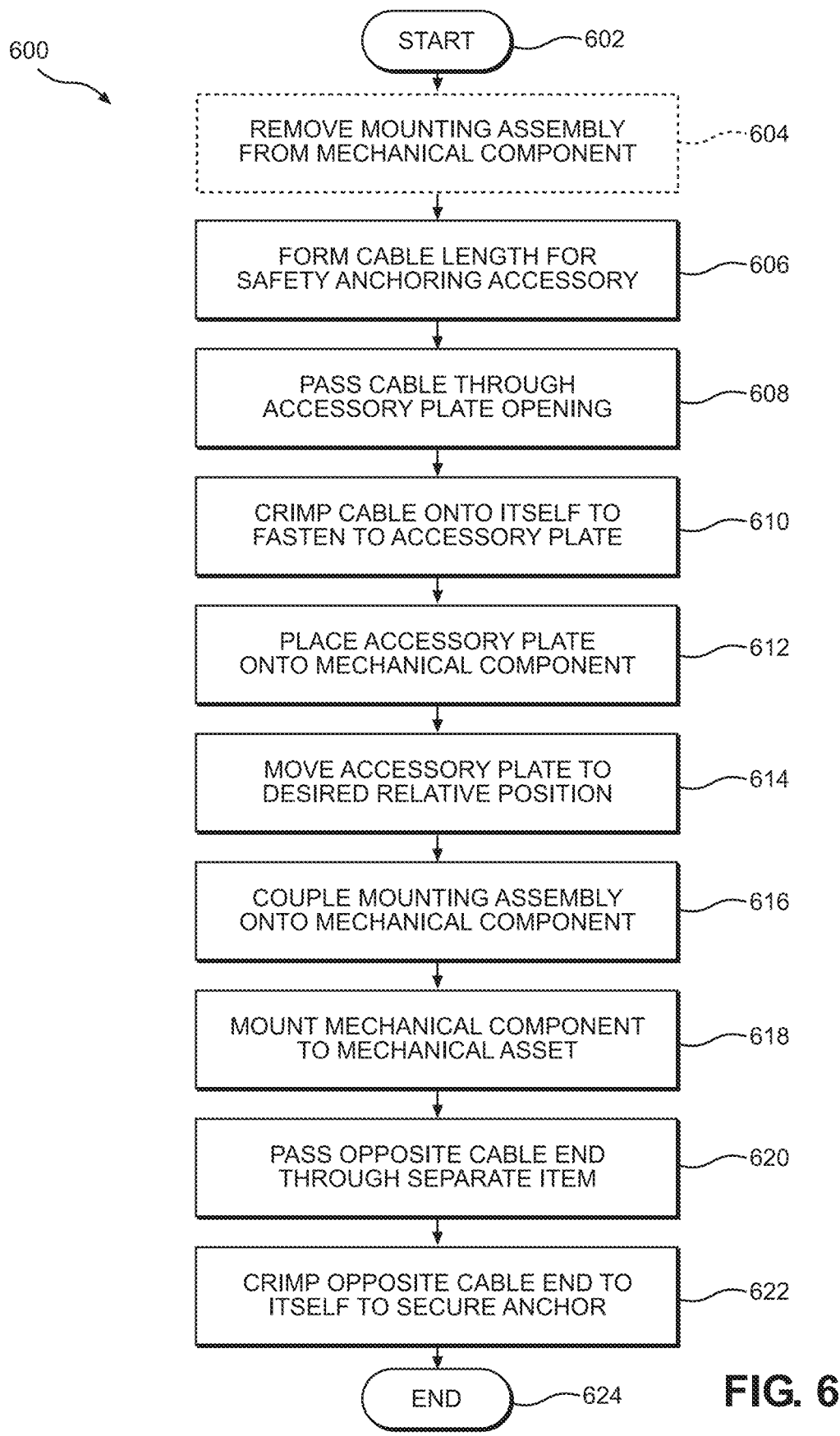
FIG. 6 illustrates a flowchart of an example detailed method of installing a safety anchoring accessory to a mechanical component mounted to a mechanical asset according to one embodiment of the present disclosure.

FIG. 6 illustrates a flowchart of an example detailed method of installing a safety anchoring accessory to a mechanical component mounted to a mechanical asset. Detailed method 600 can also be considered a method of harnessing a mechanical component, providing a redundant safety coupling for a vibration sensor or other mechanical component, or otherwise using a safety anchoring accessory in some arrangements. Detailed method 600 can represent one possible way of installing a safety anchoring accessory for a mechanical component that is mounted to a mechanical asset, and it will be understood that various other steps, features, and details of such a detailed method are not provided here for purposes of simplicity. Detailed method 600 can include some or all of the steps and details of summary method 300 above, as will be readily appreciated. While detailed method 600 contemplates an application that involves mounting a vibration sensor to an industrial motor by way of an adhesive and/or magnetic based mounting, for example, it will be readily appreciated that other mechanical components, other mechanical assets, and/or other types of mountings can alternatively be used.

After a start step 602, a first optional process step 604 can involve removing a mounting assembly from a mechanical component. For example, the mounting assembly can be removed from the mechanical component protrusion before placing the first opening of the plate over the mechanical component protrusion. Step 604 can be performed in situations where a mounting assembly is already coupled to a sensor or other mechanical component and must be removed in order to couple a plate of the safety anchoring accessory to a threaded post or other protrusion of the mechanical component, as set forth above.

At the next process step 604, a specific cable length for the safety anchoring accessory can be formed. This can involve, for example, taking an existing cable and cutting or otherwise shortening the cable to a specific length that is customized for the particular application involving a given mechanical component and a given separate structure to which the safety anchoring accessory is coupled.

Subsequent process step 608 can involve passing the cable through an opening of a plate of the safety anchoring accessory. This can be a smaller opening located at a distance from a larger opening of the plate, for example. Passing the cable through the plate opening can result in creating a loop in the cable, as illustrated and described above, such as where the cable is passed through the same cable clamp before and after passing it through the plate opening.

At a following process step 610, the cable can be crimped onto itself to fasten the cable to the plate of the safety anchoring accessory. This can involve crimping the cable clamp onto the cable when two different portions of the cable extend through the cable clamp. In some arrangements, steps 606 through 610 can be performed to form or partially form an overall safety anchoring accessory prior to coupling the accessory to the sensor other mechanical component.

At the next process step 612, a first opening of a plate can be placed over a protrusion of a mechanical component. Step 612 can be identical or substantially similar to step 306 above in some arrangements. Again, the plate can have a first opening and a second opening spaced apart from the first opening, with the plate being part of a safety anchoring accessory including various components and features as set forth above.

A following process step 614 can involve moving the plate to a desired position relative to the mechanical component. Step 614 can be identical or substantially similar to step 308 above in some arrangements. This movement can involve spinning or rotating the plate about an axis through its first opening and can be done while the first opening remains over the mechanical component protrusion. This movement can result in the second opening moving to a desired position relative to the mechanical component.

At the next process step 616, the mounting assembly can be coupled to the mechanical component, such as at the mechanical component protrusion. Step 616 can be identical or substantially similar to step 310 above in some arrangements. Again, coupling the mounting assembly to the mechanical component protrusion can result in capturing the plate onto the mechanical component protrusion. Such a capture can result in the plate being able to spin, rotate, or otherwise move freely about the protrusion in some arrangements, such as where the plate is a flat, thin, metal plate configured to spin 360 degrees around an axis extending through a first opening of the plate. Alternatively, the mechanical component can be tightened onto the mounting assembly such that the plate can no longer move relative to the protrusion.

Process step 618 can involve mounting the mechanical component to the mechanical asset while the plate is captured onto the mechanical component protrusion. Step 618 can be identical or substantially similar to step 312 above in some arrangements. Such a mounting can be an adhesive and/or magnetic based mounting, for example, although other types of mountings are also possible.

At the next process step 620, a second or opposite distal end of the cable can be passed through or around a separate structure or item used to anchor the assembly. Subsequent process step 622 can then involve crimping the second or opposite distal end of the cable to itself to secure the cable to the separate structure. Steps 620 and 622 can be similar to steps 608 and 610 above regarding securing the second distal end of the cable to the separate structure.

The method can then end at step 624. For foregoing detailed method 600, it will be appreciated that not all process steps are necessary, and that other process steps may be added in some arrangements. For example, steps 606, 620, and 622 might be unnecessary where the cable is already formed and coupled to the separate structure or other rigid item. Added steps can also be included, such as, for example, forming the mounting accessory or clamping the accessory plate such that it is no longer able to move. Further process steps can include modifying or adjusting the safety anchoring accessory, such as to better adapt to a given installation situation or environment. This might involve bending the flat accessory plate, for example, as set forth in greater detail below. Steps can also be performed in different orders where practical, and some steps can be performed simultaneously. For example, steps 612 and 614 can be performed at the same time. Although known process steps are provided for the various techniques in detailed method 600, it will be appreciated that other similar methods for installing a safety anchoring accessory to a mechanical component mounted to a mechanical asset are also possible.

Figure 7A:
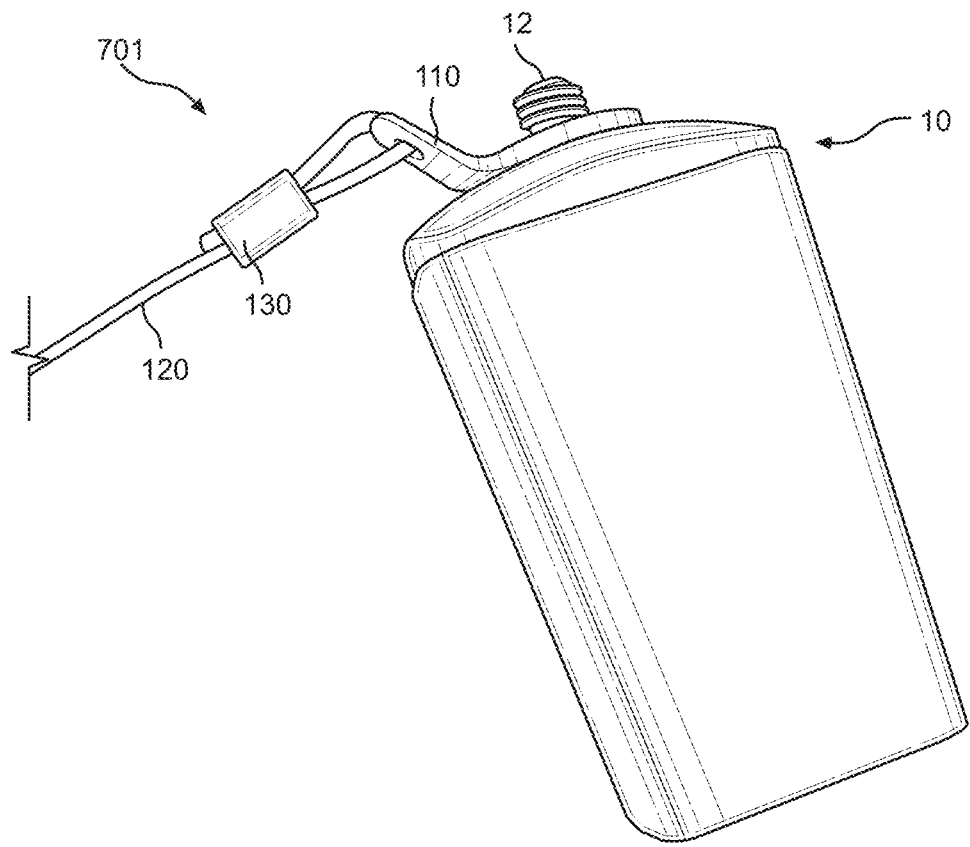
FIG. 7A illustrates in side perspective view an example safety anchoring accessory with a bent plate placed onto an associated mechanical component protrusion according to one embodiment of the present disclosure.
Figure 7B:
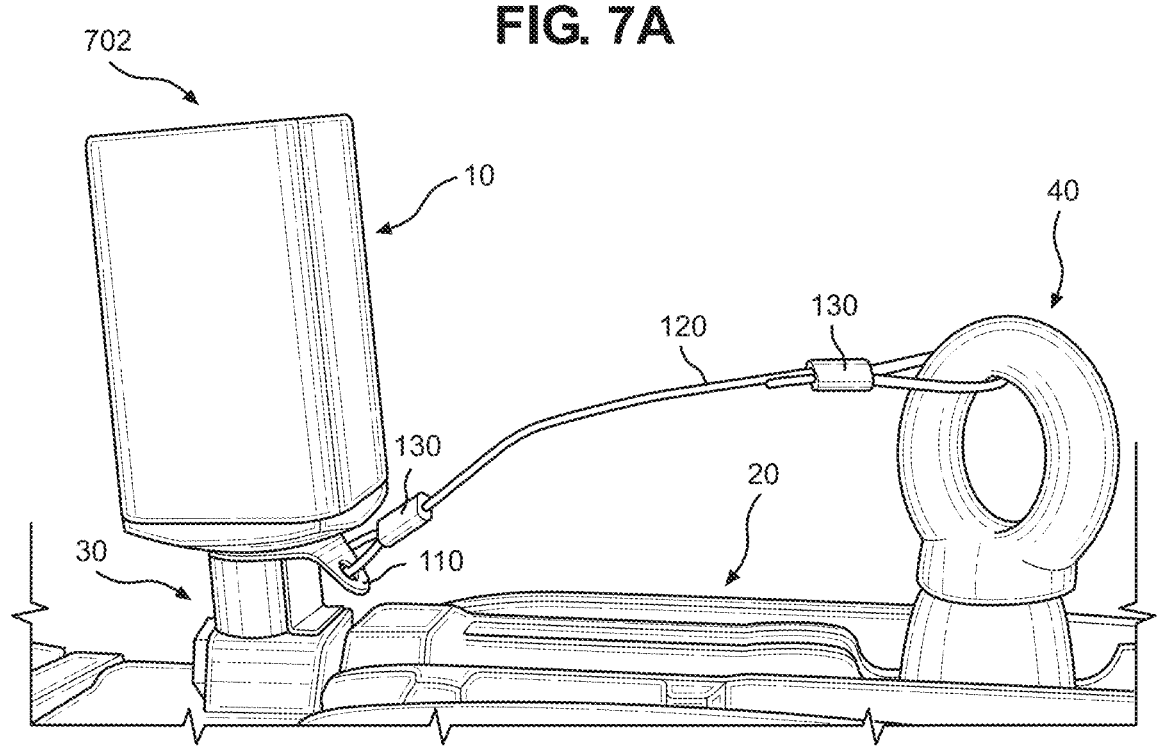
FIG. 7B illustrates in side perspective view an example environment with a mechanical component mounted to a mechanical asset while a safety anchoring accessory with a bent plate prevents the mechanical component from falling in the event of a mounting failure according to one embodiment of the present disclosure.

Lastly, FIGS. 7A and 7B illustrate in side perspective views arrangements involving an example modified safety anchoring accessory. FIG. 7A shows environment 701 of a safety anchoring accessory with a bent plate placed onto an associated mechanical component protrusion. Similar to that which is shown in FIG. 4C above, environment 701 reflects a stage in the overall installation process of a safety anchoring accessory where plate 110 has been bent from its original flat form as well as placed onto protrusion 12 of mechanical component 10 before the mechanical component has been coupled to a mounting assembly and/or a separate mechanical asset. Again, a cable 120 is coupled to bent plate 110, which has been placed over threaded post or other protrusion 12 of a vibration sensor or other mechanical component 10. Cable 120 is looped back onto itself and held in place by a crimped cable clamp 130. Protrusion 12 is then ready for coupling to a mounting assembly and/or mechanical asset, at which point bent plate 110 will then be captured onto the protrusion such that it is coupled to the protrusion and cannot be readily removed.

FIG. 7B shows environment 702 of a safety anchoring accessory with a bent plate fully installed into a particular application. Similar to that which is shown in FIG. 2A above, environment 701 can include a vibration sensor or other mechanical component 10 that is mounted to an industrial motor or other mechanical asset 20, which can involve the use of a mounting assembly 30 as detailed above. A safety anchoring accessory can provide a secondary or redundant safety coupling to anchor mechanical component 10 to rigid metal loop or other separate structure 40 to prevent it from falling in the event that the primary mounting arrangement ever fails. As illustrated and detailed above, this safety anchoring accessory can include a cable 120 held in place at both ends by cable clamps 130 and a plate 110 used to couple the cable to the mechanical asset.

Unlike the foregoing arrangements, plate 110 is shown as being bent in environments 701 and 702 of FIGS. 7A and 7B. This can be a result of preforming a flat plate into a desired bent configuration or by bending the plate as desired at any time during an installation process. For example, flat plate 110 can be placed over a mechanical component protrusion 12 and then the flat plate can be bent manually to the configuration shown in FIG. 7A. As will be readily appreciated, bending plate 110 can allow this plate and the overall safety anchoring accessory to be able to fit a wider range of mechanical components, mechanical assets, and/or specific installation environments. Adjusting or modifying plate 110 into the shown bent formation can provide benefits with respect to a number of custom arrangement or installation environment factors, such as improved cable location, greater spacing from the sensor or other mechanical component, and/or reduced environmental spacing availability at the full plate length, for example. For the foregoing purposes, plate 110 can be an originally flat plate formed of a material that is sufficiently strong enough to retain a bent shape and support its harnessed mechanical component when needed, but that is sufficiently flexible enough to be bent during an installation process. Plate 110 can thus be formed from, for example, stainless steel having a thickness of about 1/16 to 1/8 inch. Other materials and thicknesses are also possible.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A safety anchoring system, comprising:
   a sensor having a protrusion configured to facilitate mounting the sensor to a separate mechanical asset that is larger than the sensor;
   a plate having a first opening with an axis extending therethrough and a second opening spaced apart from the first opening, wherein the first opening is placed over the sensor protrusion such that the second opening is movable relative to the sensor;
   a cable having a cable length, a first distal end inserted through the second opening of the plate, and a second distal end configured to be fastened to a separate structure, wherein the cable length is longer than a distance from the separate structure to the second opening of the plate when the sensor is mounted to the separate mechanical asset to form a primary coupling of the sensor; and
   a first cable clamp coupled to the first distal end of the cable such that the first cable clamp secures the cable to the plate at the second opening of the plate, wherein coupling the second distal end of the cable to the separate structure results in anchoring the sensor to the separate structure.

2. The safety anchoring system of claim 1, wherein the sensor is a vibration sensor.

3. The safety anchoring system of claim 1, wherein the sensor protrusion is a threaded post that extends from the sensor.

4. The safety anchoring system of claim 1, wherein the sensor protrusion is configured to be inserted into a separate mounting assembly that in turn is configured to facilitate mounting the sensor to the separate mechanical asset, and wherein the plate is configured to be located between the sensor and the separate mounting assembly such that the plate is captured onto the sensor protrusion.

5. The safety anchoring system of claim 1, wherein anchoring the sensor to the separate structure forms a secondary coupling of the sensor where the cable is slack and prevents the sensor from falling in the event of a mounting failure in the primary coupling between the sensor and the separate mechanical asset.

6. The safety anchoring system of claim 1, further comprising:
   a second cable clamp configured to be coupled to the second distal end of the cable such that the second cable clamp secures the cable to the separate structure.

7. The safety anchoring system of claim 1, wherein the plate is configured to spin about the axis through the first opening such that the second opening can be repositioned to any lateral direction relative to the sensor protrusion.

8. The safety anchoring system of claim 1, wherein the plate is flat, thin, and formed from metal.

9. A method of installing the safety anchoring system of claim 1 to a mechanical asset, the method comprising:
   placing a first opening of a plate over a protrusion of a sensor, the plate having the first opening and a second opening spaced apart from the first opening, with the plate being part of a safety anchoring system including the sensor, the plate, a cable, and a first cable clamp, wherein the cable includes a first distal end inserted through the second opening of the plate and the first cable clamp is coupled to the first distal end of the cable such that the first cable clamp secures the cable to the plate at the second opening of the plate;
   moving the plate while the first opening remains over the sensor protrusion, wherein moving the plate results in the second opening moving to a desired position relative to the sensor;
   coupling a mounting assembly to the sensor protrusion, wherein coupling the mounting assembly results in capturing the plate onto the sensor protrusion; and
   mounting the sensor to the mechanical asset while the plate is captured onto the sensor protrusion.

10. The method of claim 9, wherein the sensor is a vibration sensor.

11. The method of claim 9, further comprising the step of:
    coupling a second distal end of the cable to a separate structure, wherein coupling the cable to the separate structure and capturing the plate onto the sensor protrusion while the cable is secured to the plate results in anchoring the sensor to the separate structure.

12. The method of claim 11, wherein coupling the second distal end of the cable includes coupling a second cable clamp to the second distal end of the cable such that the second cable clamp secures the cable to the separate structure.

13. The method of claim 9, wherein the length of the cable is longer than a distance from the separate structure to the second opening of the plate when the first opening of the plate is placed over the sensor protrusion, the sensor is mounted to the mechanical asset, and a second distal end of the cable is coupled to a separate structure.

14. The method of claim 9, wherein moving the plate involves spinning the plate about an axis through the first opening such that the second opening of the plate rotates around the axis at a fixed distance therefrom.

15. The method of claim 14, wherein the plate is a flat thin plate configured to spin freely 360 degrees around the axis.

16. The method of claim 9, further comprising the step of:
    removing the mounting assembly from the sensor protrusion before placing the first opening of the plate over the sensor protrusion.

17. The method of claim 9, further comprising the steps of:
    forming the cable at a specific cable length, wherein the specific cable length is longer than a distance from a separate structure to the second opening of the plate when the first opening of the plate is placed over the sensor protrusion and the sensor is mounted to the mechanical asset;

passing the first distal end of the cable through the second opening of the plate; and crimping the first distal end of the cable onto itself using the first cable clamp such that the first cable clamp secures the cable to the plate at the second opening of the plate.

18. The safety anchoring system of claim 1, wherein the flat plate is configured to be bent manually during an installation process to facilitate adjusting the position of the second opening relative to the first opening.

19. The safety anchoring system of claim 1, wherein the primary coupling supports the sensor by default and anchoring the sensor to the separate structure forms a secondary coupling of the sensor that supports the sensor only when the primary coupling fails.

20. A safety anchoring accessory, comprising:

a plate having a first opening with an axis extending therethrough and a second opening spaced apart from the first opening, wherein the first opening is configured to be placed over a protrusion of a separate sensor such that the second opening is movable relative to the separate sensor, and wherein the plate is flat, thin, formed from metal, and configured to be bent manually during an installation process;

a cable having a cable length, a first distal end inserted through the second opening of the plate, and a second distal end configured to be fastened to a separate structure, wherein the cable length is longer than a distance from the separate structure to the second opening of the plate when the first opening of the plate is placed over the separate sensor protrusion and the separate sensor is mounted to a separate mechanical asset that is larger than the separate sensor to form a primary coupling of the separate sensor; and a first cable clamp coupled to the first distal end of the cable such that the first cable clamp secures the cable to the plate at the second opening of the plate, wherein placing the first opening of the plate over the separate sensor protrusion and fastening the second distal end of the cable to the separate structure results in anchoring the separate sensor to the separate structure to form a secondary coupling of the separate sensor where the cable is slack.

\* \* \* \* \*